UNITED STATES PATENT OFFICE.

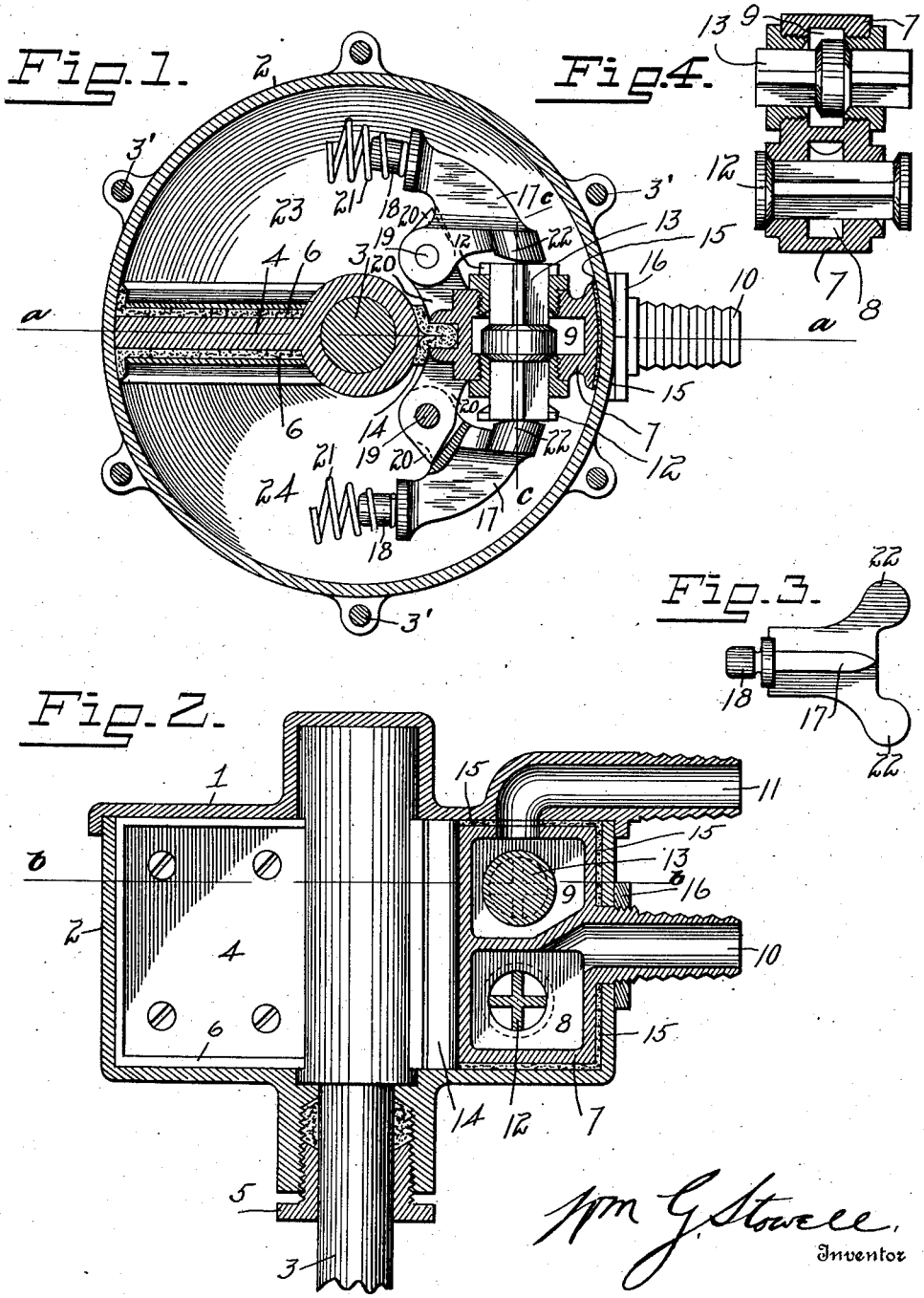

WILLIAM G. STOWELL, OF DAYTON, OHIO, ASSIGNOR TO THE W. G. STOWELL COMPANY, OF DAYTON, OHIO, A CORPORATION OF OHIO.

SEMIROTARY MOTOR.

1,025,933. Specification of Letters Patent. Patented May 7, 1912.

Application filed May 14, 1909. Serial No. 495,886.

*To all whom it may concern:*

Be it known that I, WILLIAM G. STOWELL, a citizen of the United States, residing at Dayton, in the county of Montgomery and State of Ohio, have invented certain new and useful Improvements in Semirotary Motors; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in fluid motors of the semi-rotary type adapted to furnish power for domestic use, such for example, as driving washing machines.

The object of the invention is to combine in a motor of this character a maximum efficiency and minimum cost of construction and installation.

In carrying out the object of the invention, the construction is such as to permit of the valve housing being located on the interior of the cylinder or motor casing, and the valve actuators being mounted independently of the piston and in a manner and of a construction which avoids any side strain being exerted upon the valves while they are being actuated. These, as well as other structural characteristics and advantages, will more fully appear in the following description which is submitted in connection with the accompanying drawings, of which—

Figure 1, is a horizontal sectional view of the motor on the line *b b* of Fig. 2. Fig. 2, is a vertical sectional view on the line *a a* of Fig. 1. Fig. 3, is a detached detail view of one of the valve actuators. Fig. 4, is a sectional view of the valve housing and valves.

Throughout the specification and drawings, similar reference characters indicate the same part or parts.

The cylinder or motor casing consists of a cylinder 2 which is inclosed on one side by a detachable cap 1, the latter being united to the cylinder by a suitable number of screws or bolts 3'. Within the casing so constituted, is a piston 4 provided with suitable packing 6 which seals the opposite sides of the interior of the cylinder. The piston is mounted upon a shaft 3 which is provided at one end with an inclosed bearing, and on the opposite side of the motor, the shaft bearing is provided with a stuffing box 5. Also within the cylinder and occupying the space between the shaft and the inner circumference of the cylinder is a valve housing 7 in which are provided non-communicating inlet and exhaust chambers 9 and 8 respectively. The said valve housing is provided with suitable packing 15 which is placed between the exterior of said housing and the adjacent sides of the cylinder, and packing 14 which is placed between said housing and the hub of the piston which incloses the shaft 3. These packings seal the opposite sides of the cylinder and thus prevent the motive fluid from passing from one or the other side of the housing. The said housing is provided with a stem 10 which projects through the side of the cylinder and is rigidly held in position by a nut 16 which screws against the outer side of the cylinder. The stem 10 communicates with the exhaust chamber and provides the outlet from the motor, which may be conducted through a suitable conductor, such as a hose (not shown) which is inserted over the stem and against the nut 16. The inlet chamber 9 is fed through a nozzle or inlet pipe 11 which opens through the cap 1 and is also adapted to be connected with a suitable conductor, such as a rubber hose (not shown) which leads from the source of water supply.

Within the inlet chamber 9 is located a well-known form of valve 13 which is adapted to seat on the interior sides of said chamber, and within the exhaust chamber 8 is located a well-known form of valve 12 which seats on the exterior sides of the valve housing. The manipulation of these valves changes the course of the motive fluid through the housing to the chambers 23 and 24 of the cylinder. The said inlet and exhaust valves 12 and 13 in the operations of the motor, are engaged by cam extensions 22 of valve actuators 17, there being one of these valve actuators located at the opposite ends of the valves. It will be observed that the valve actuators 17 are pivoted eccentrically to the shaft 3 and are of a construction which enables the contacting ends 22 to engage the opposite ends of the valves 12 and 13, so that the force exerted thereby upon said valves is parallel to the plane of the valve movement, thereby avoiding any side pressure upon said valves which would be apt to create undue wear.

While the particular form of the valve actuators shown in the drawings is believed to be preferable, it will of course be understood that immaterial changes might be made therein without departing from the essential requisites of said valve actuators, to-wit: their manner of mounting and the force exerted thereby upon the opposite ends of the valves. The mounting of the valve actuators is by means of pins 19 which penetrate bifurcated extensions of said actuators and extensions 20 which join the inner portion of the valve housing. The housing extensions 20 act as stops to prevent the valve actuators 17 having too great a movement away from the valves, for example, it is desirable that the ends 18 of the valve actuators shall normally lie in a position to be engaged squarely by the piston. The extensions 20 are therefore of a character which limits the free outward movement of the actuators. The ends of said actuators support helical springs 21 which extend beyond the actuators, and these springs are first engaged alternately by the piston and are compressed until the ends of the actuators are engaged by the piston. The springs are thus compressed when the piston reaches the ends of its stroke, and the ends or stems 18 of said actuators are engaged and the same are rocked to initially move the valves. After said valves have been thus partially moved, they become balanced owing to the fact that the pressure of the motive fluid is equal on both sides of the piston. The compressed springs, however, instantly act to complete the movement of said valves and to thus reverse the flow of the motive fluid and the operation of the piston.

Having described my invention, I claim:

1. In a motor of the type specified, a cylinder and a piston, in combination with inlet and exhaust valves located on the interior of the cylinder, and valve actuators pivoted independent of the piston and located between the piston and the valve housing, said valve actuators so mounted being adapted to apply force to both of said valves in lines approximately parallel with the planes of the movement of said valves, throughout the entire movement of said valve.

2. In a motor of the type specified, a cylinder, a piston, valves located in said cylinder, valve actuators pivoted free from the piston and between the piston and the valve housing, said valve actuators imparting to both valves force on lines approximately parallel to the planes of the movement of said valves throughout their entire movement, and springs adapted to impart the final movement to said valve actuators.

3. In a motor of the type specified, the combination with a cylinder and a piston therein, of a valve housing within said cylinder, inlet and exhaust valves mounted in said housing, valve actuators mounted upon pivots eccentric to the piston shaft, and free from connection with the piston and springs supported upon said valve actuators and adapted to be compressed by the engagement of the piston therewith and to impart the final movement to said valves after said valves have been initially moved by the piston.

4. In a semi-rotary water motor, the combination with a cylinder, a piston, inlet and exhaust valves, of spring-supporting valve actuators pivoted within said cylinder, the said pivots being free from connection with the piston, and the said valve actuators being adapted to be given their initial movement by the piston, and their final movement by the springs in reversing the piston to change the direction of the flow of motive fluid to the piston.

5. In a semi-rotary water motor, the combination with a cylinder, a piston, an inlet and exhaust valve, of valve actuators mounted independently of the piston and located between the piston and the valve housing, said actuators engaging the ends of both valves at points approximately in line with the longitudinal axes of said valves and adapted to apply force to the valves approximately parallel to the plane of the valve movement throughout the entire valve movement, and springs adapted to be compressed by the action of the piston to impart the final movement to the valves through said actuators after said valves have been initially opened by the piston engaging the actuators.

6. In a semi-rotary water motor, the combination with a cylinder, a piston, a valve housing, and inlet and exhaust valves mounted in said housing, of valve actuators mounted independently of the piston on pivots eccentric to the axis of the piston, said valve actuators engaging the ends of the valves at their centers, and adapted to apply force to the valves in directions approximately parallel to the movement of said valves and throughout the entire movement of said valves, springs supported upon said actuators and adapted to impart the final movement to the actuators and the valves after said actuators and valves have been initially moved through contact of the piston with said actuators.

7. In a semi-rotary water motor, the combination with a cylinder, a piston, a valve housing on the interior of said cylinder, and inlet and exhaust valves mounted in said housing, of valve actuators mounted independently of the piston, said valve actuators mounted upon pivots, and the longitudinal axes of the valves being tangential to cylinders the centers of which coincide with the pivots of said actuators, and springs adapted to impart the final movement to the valve actuators and the valves after said valve actuators and valves have been initially moved by the piston.

In testimony whereof I affix my signature, in presence of two witnesses.

WILLIAM G. STOWELL.

Witnesses:
    MATTHEW SIEBLER,
    R. J. MCCARTY.

Copies of this patent may be obtained for five cents each, by addressing the "Commissioner of Patents, Washington, D. C."